United States Patent [19]
Parker

[11] Patent Number: 5,878,781
[45] Date of Patent: Mar. 9, 1999

[54] REVERSING VALVE AND METHOD

[75] Inventor: Thomas W. Parker, Columbus, Ohio

[73] Assignee: Ranco Incorporated of Delaware, Wilmington, Del.

[21] Appl. No.: 467,295

[22] Filed: Jun. 6, 1995

Related U.S. Application Data

[62] Division of Ser. No. 307,348, Sep. 16, 1994.

[51] Int. Cl.$^6$ ..................................................... F16K 11/08
[52] U.S. Cl. ...................................... 137/625.43; 251/160
[58] Field of Search ........................... 137/1, 14, 625.29, 137/625.43, 599.1; 251/160, 175, 56

[56] References Cited

U.S. PATENT DOCUMENTS

| | | | |
|---|---|---|---|
| 2,855,000 | 10/1958 | Van Allen et al. | 137/625.43 |
| 2,857,929 | 10/1958 | Whitlock, Jr. . | |
| 2,947,324 | 8/1960 | Cooper et al. . | |
| 2,976,701 | 3/1961 | Greenawalt . | |
| 3,037,525 | 6/1962 | Wiegers . | |
| 3,142,313 | 7/1964 | Plumettaz . | |
| 3,339,583 | 9/1967 | Fleckenstein et al. . | |
| 3,369,790 | 2/1968 | McHale et al. . | |
| 3,448,959 | 6/1969 | McHale et al. . | |
| 3,985,154 | 10/1976 | Hargraves . | |
| 4,139,355 | 2/1979 | Turner et al. . | |
| 4,212,324 | 7/1980 | Bauer . | |
| 4,311,020 | 1/1982 | Tobin et al. . | |
| 4,564,045 | 1/1986 | Koch et al. . | |
| 4,573,497 | 3/1986 | White . | |
| 4,644,973 | 2/1987 | Itoh et al. . | |
| 4,712,582 | 12/1987 | Marks . | |
| 4,753,271 | 6/1988 | Fornasari . | |
| 4,825,908 | 5/1989 | Tsuchihashi et al. . | |
| 5,265,438 | 11/1993 | Knowles et al. . | |

FOREIGN PATENT DOCUMENTS 58-42876 of 1983 Japan .

OTHER PUBLICATIONS

Two pages of drawings legends in Japanese, undated.
Brochure for PE Valve Co., Product Engineering Corporation Valves, Showing Various Valves; undated.

*Primary Examiner*—John Fox
*Attorney, Agent, or Firm*—Watts Hoffmann Fisher & Heinke

[57] ABSTRACT

A reversing valve for a vapor compression refrigeration system comprising a housing defining a chamber with a high pressure port, a low pressure port and first and second system ports opening into said chamber through a chamber wall; a valve member disposed in the housing for shifting movement generally parallel to the wall between a first position wherein the valve member communicates the low pressure port with the first system port while communicating the high pressure port with the second system port and a second position wherein the valve member communicates the low pressure port with the second system port while communicating the high pressure port with the first system port, the valve member blocking communication between the high and low pressure ports when in the first and second positions; the valve member subjected to a net differential pressure force acting to firmly seat the valve member in the first or second position for preventing leakage between the high pressure port and the low pressure port; and, an actuator for reversing the direction of the net differential pressure force acting on the valve member to unseat the valve member and move it away from its first or second position for facilitating the shifting movement to the other position.

12 Claims, 6 Drawing Sheets

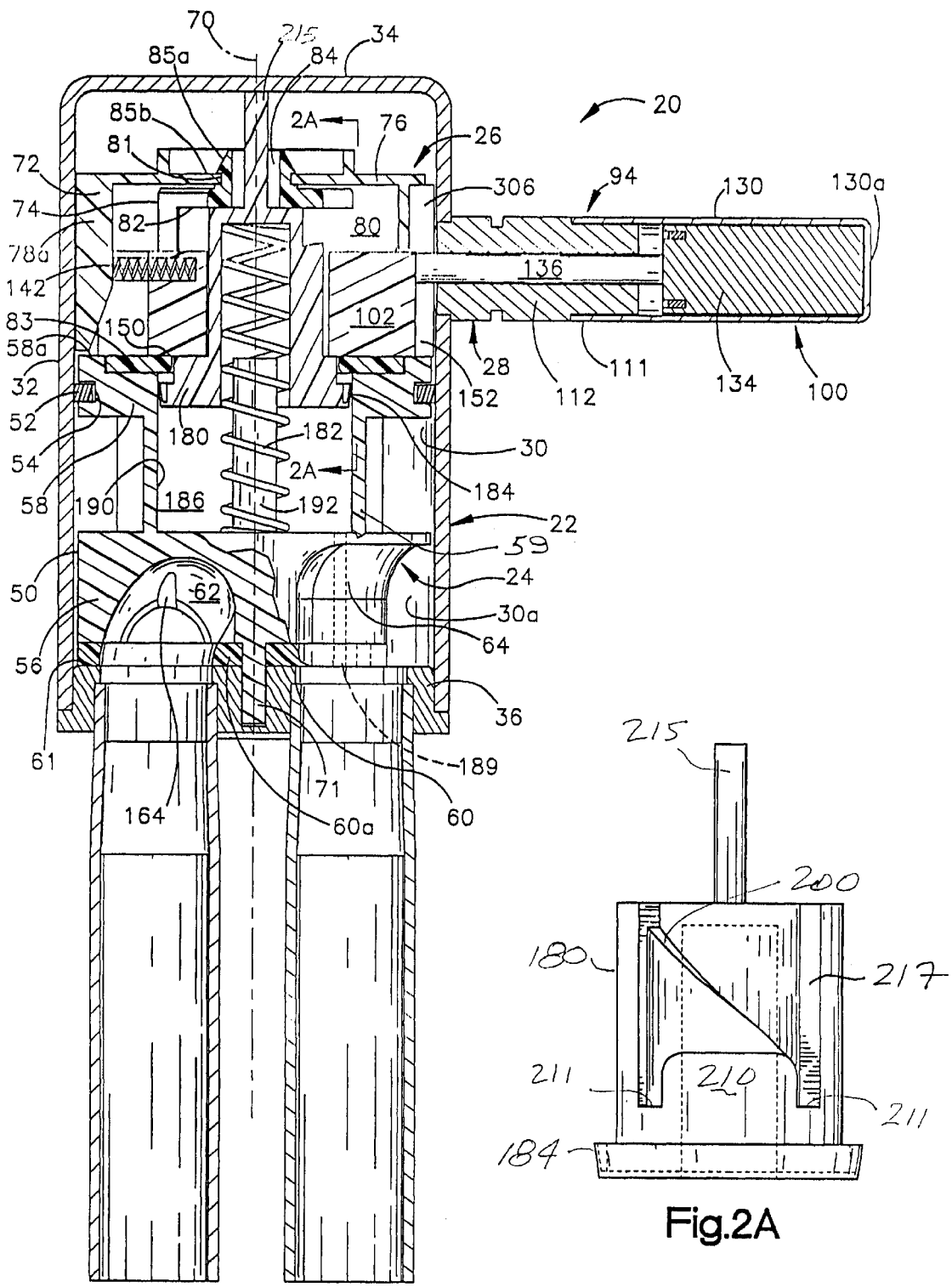

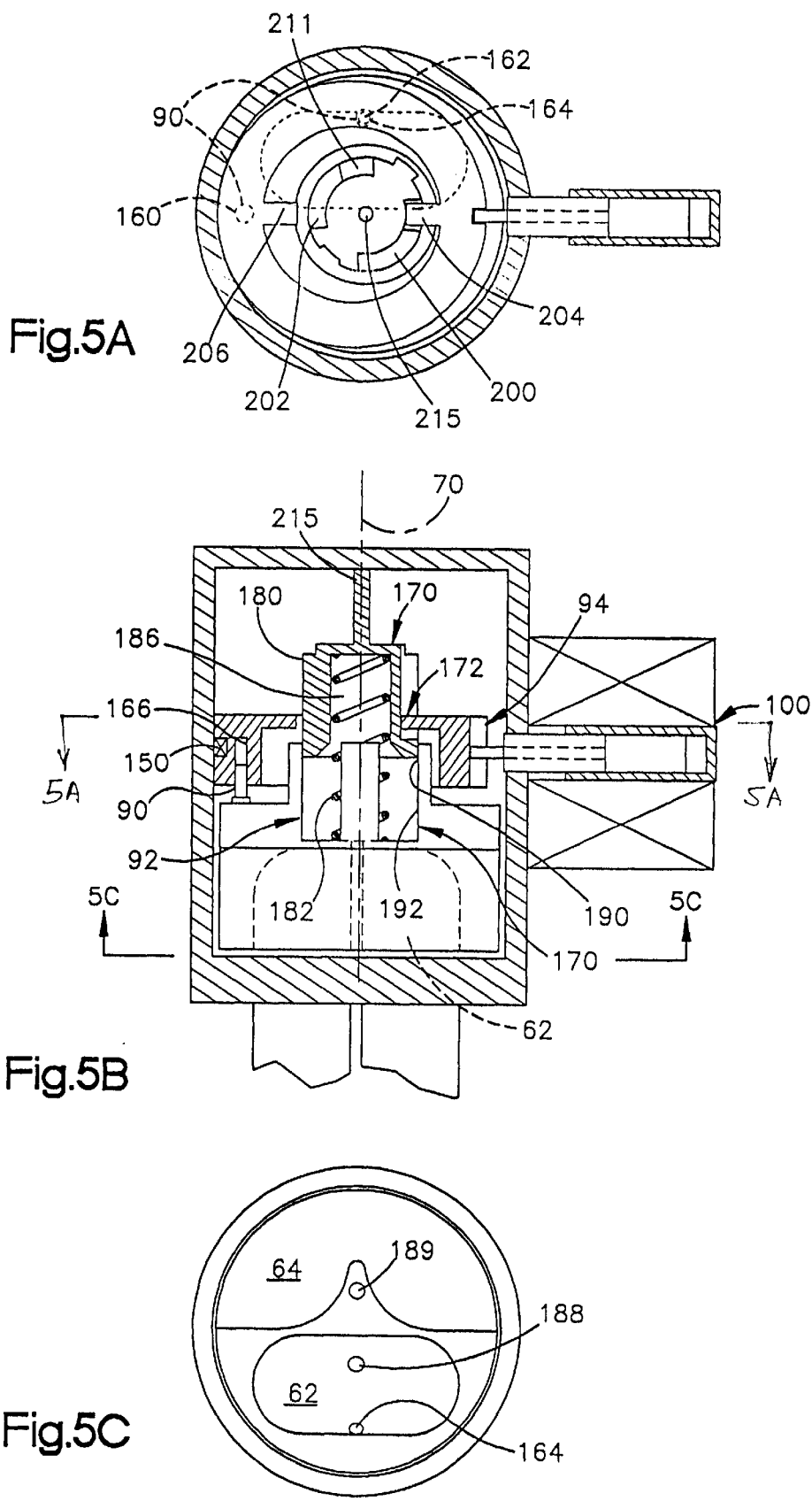

REVERSING VALVE AND METHOD

This is a divisional of copending application Ser. No. 08/307,348 filed on Sep. 16, 1994.

FIELD OF THE INVENTION

The present invention relates to reversing valves and more particularly to flow reversing valves used in fluid systems having large differentials between the high and low system pressures.

BACKGROUND OF THE INVENTION

Valves for reversing the fluid flow direction in a fluid system are generally known and take many forms. When the highest system pressure differs substantially from the lowest system pressure, the system flow reversing valve is subjected to difficult operating conditions. Such conditions place limitations on the types and kinds of reversing valves employed. Refrigerant reversing valves used in vapor compression refrigeration systems are exemplary.

Refrigerant flow reversing valves are typically placed in refrigeration systems, such as heat pumps. The high refrigerant pressure in the system may exceed the system low pressure by more than 400 psi. This pressure differential is applied to the reversing valve structure so that it is subjected to significant pressure forces. These forces contribute to the possibility of refrigerant leakage from the high pressure side to the low pressure side within the valve as well as creating frictional forces resisting valve actuation.

The prior art proposed a reversing valve construction which was successful in reducing leakage by relying on differential pressure forces to assure sealing relationships between valve parts. This type of valve construction is illustrated by U.S. Pat. No. 4,712,582 issued Dec. 15, 1987 to Marks (the '582 patent). This type of valve relied on a valve slide member in a high pressure chamber coacting with alternative pairs of ports in a valve seat to control the system refrigerant flow direction. The slide member moved along the seat from one flow directing position to an alternate, flow reversing position. High pressure system fluid forced the slide member against the seat at all times during compressor operation. The valve seating force tended to minimize refrigerant leakage from the high pressure system side to the low pressure side. Low leakage rates improved system performance and efficiency.

The seating forces produced great frictional forces opposing valve slide member movement. Accordingly in some prior art systems the reversing valve was operated only after the compressor had ceased operation and the system pressures had been permitted to equalize or move toward equalization. In systems where flow reversal was required while the compressor operated, powerful actuators were required to overcome the frictional forces and operate the reversing valve. The control and construction of reversing valve actuators significantly complicated the reversing valve assemblies while adding materially to their cost.

A number of actuator concepts were proposed over time. The '582 patent actuator, for example, comprised a pilot valve assembly and actuating pistons mounted to the slide member and confronting respective opposite ends of the cylindrical high pressure chamber. The pilot valve assembly controlled the communication of system refrigerant to the valve chamber.

The pilot valve assembly was formed by a low power control solenoid and a miniature four way pilot valve operated by the solenoid. When the solenoid was deenergized the pilot valve was conditioned to simultaneously supply high pressure refrigerant to one chamber end and low pressure refrigerant to the other chamber end. The pistons were subjected to differential refrigerant pressure force sufficient to shift the slide member to one of its positions.

Energizing the solenoid actuated the pilot valve to reverse the pressure application to the pistons. Whenever the piston pressures reversed, the slide member was driven to its alternate position on the valve seat and system refrigerant flow direction reversed.

Such actuators, while effective and reliable, consisted of numerous parts requiring many manufacturing operations to fabricate. These kinds of valve constructions did not lend themselves to automated production. Reversing valve costs were high because of their relatively large labor content.

Furthermore, different sized valves were required for different sized systems. Refrigeration systems built to chill small, relatively well insulated spaces contain small amounts of refrigerant circulated at low flow rates through relatively small heat exchangers. High capacity systems for chilling large, or uninsulated, spaces contain much larger amounts of refrigerant circulated at high flow rates through large heat exchangers. A reversing valve, of the sort referred to, constructed for a high capacity system was capable of handling the refrigerant flow of a smaller system; however, small systems could not be relied upon to produce sufficient energy to properly actuate an oversized reversing valves.

Where a small capacity system was provided with an oversized valve, the valve could fail to complete a flow reversal if the reversal occurred when the compressor was off. Actuating such a valve about half-way through its stroke resulted in the valve member communicating the system high and low pressure sides with each other. Large area flow passages provided by the valve member rapidly depleted and diverted the supply of high pressure refrigerant which would otherwise be available for actuating the valve member through the remainder of its stroke. Accordingly the valve member could remain in its partially actuated condition even after the compressor started up again. The possibility of such occurrences necessitated constructing valves which were sized to accommodate system flows as well as to assure adequate valve actuating pressure differentials.

Modern refrigeration system components have also created conditions which have adversely impacted reversing valves. Unlike previous compressors, the newer scroll type refrigerant compressors were positive displacement compressors which could "pump" liquified refrigerant from within the compressor to the system. Scroll compressors may discharge liquified refrigerant into the high pressure side of the system via the reversing valve for an appreciable time after compressor start up. This occasionally created reversing valve problems.

When the valve slide member is between its alternative operating positions, high pressure refrigerant flow from the chamber could be restricted significantly. If this valve condition existed while a scroll compressor was pumping liquified refrigerant into the reversing valve chamber, an extreme pressure spike could be created within the valve chamber itself. Such pressure spikes could damage or destroy the reversing valve.

To lessen the great frictional forces while operating a reversing valve, a proposal was made to construct a manually operated reversing valve having a spring biased venting valve associated with it. See U.S. Pat. No. 2,855,000, issued Oct. 7, 1958 to Van Allen, et al. The venting valve was manually opened against the spring bias to reduce the pressure differential applied across the reversing valve member. This reduced the magnitude of the frictional force resisting reversing valve member movement. The reversing valve member was subjected to rapidly changing differential pressure forces causing it to dither and exhibit somewhat reduced frictional force opposing its movement.

The reversing valve was then manually actuated to reverse the flow direction. After the reversing valve was operated, the biasing spring reclosed the venting valve. This proposal was not commercially feasible in an environment requiring automatic flow reversals because the required manual operation could not be duplicated by simple, low force mechanical actuators.

The present invention provides a new and improved valve and method for reversing fluid flow circulating in a fluid system which is so constructed and arranged that the valve member is relieved from system fluid pressure forcing it against its seat as it moves between alternative flow directing positions along a path of travel by which it is separated from its seat, thereby avoiding substantial friction forces opposing valve member motion and enabling use of simple, low force valve actuators. The new reversing valve is of uncomplicated construction, comprises relatively few, easily fabricated and assembled components and yet is reliable and effective in operation.

SUMMARY OF THE INVENTION

The present invention provides a new and improved method of reversing the flow direction in a fluid system, or circuit, comprising: communicating a high pressure port, a low pressure port and first and second system ports to a valve chamber with at least the low pressure port and the first and second system ports opening into the chamber via a valve seat; stationing a valve member in the chamber for movement with respect to the valve seat between first and second positions; forcing the valve member into seating and sealing engagement with the valve seat in the first position on the valve seat by applying differential pressure to the valve member; directing system fluid through the system in one direction by communicating the low pressure port with the first system port via the valve member and communicating the high pressure port with the second system port when the valve member is seated in the first position; biasing the valve member to move from the first position to the second position; dissipating the differential pressure to enable unseating the valve member; shifting the valve member in response to the biasing force from the first position to the second position along a path of travel where the valve member is disengaged from the seat; reseating the valve member on the valve seat in its second position; and, reversing the system fluid flow direction by communicating the low pressure port with the second system port via the valve member and communicating the high pressure port and first system port when the valve member is seated in the second position.

In a preferred embodiment of the invention the valve member is biased to move from one position to the other by an actuating device rendered effective when the differential pressure is dissipated.

BRIEF DESCRIPTION OF THE DRAWINGS

Further features and advantages of the invention will become apparent from the following description of a preferred mode of practicing the invention, made in reference to the drawings wherein:

FIG. 2 is a cross sectional view of the valve of FIG. 1, assembled, and seen at the instant the valve member has completed its shifting motion to reverse the system flow direction or when the compressor is off and the system pressures are equalized;

FIG. 2A is a view seen approximately from the plane indicated by the line 2A—2A of FIG. 2;

FIG. 5A is a cross sectional view seen approximately from the plane indicated by the line 5A—5A of FIG. 5B;

FIG. 5B is a cross sectional view, similar to FIG. 2, in which the valve is illustrated schematically in one operating condition with various valve parts omitted for purposes of clarity;

FIG. 5C is a cross sectional view seen approximately from the plane indicated by the line 5C—5C of FIG. 5B;

BEST MODE FOR PRACTICING THE INVENTION

Figure 1:
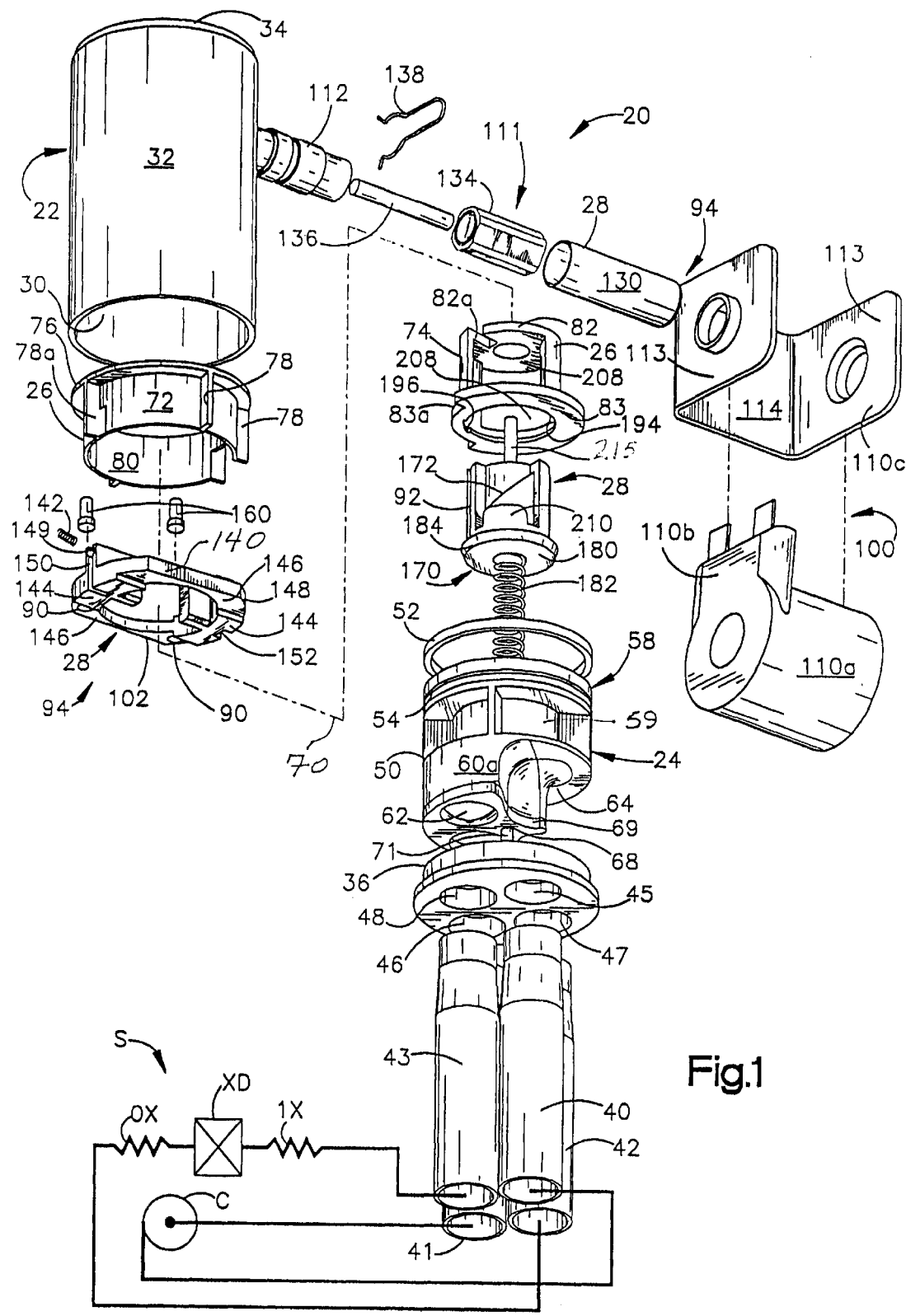
FIG. 1 is a perspective exploded view of a reversing valve constructed according to the present invention, connected to a schematically illustrated refrigeration system.

A valve 20 constructed according to the invention for reversing flow in a fluid system, or circuit, is illustrated in the drawings. The preferred and illustrated valve 20 is a refrigerant flow reversing valve constructed for installation in a vapor compression refrigeration system S such as a heat pump (FIG. 1). The system S may be of any conventional or suitable construction and is illustrated as comprising a compressor C, indoor and outdoor heat exchangers IX and OX, respectively, with an expansion device XD stationed between the heat exchangers. Referring to FIGS. 1 and 2 the valve 20 comprises a housing assembly 22, a valve member 24 disposed in the housing, a valve carrier 26 for supporting the valve member in the housing and an actuator 28 for shifting the valve member 24 within the housing between first and second positions to reverse the refrigerant flow direction through the system S.

The housing assembly 22 defines an internal chamber 30 containing the valve member 24 and communicating with the system S. The preferred housing assembly 22 comprises a cylindrical pressure vessel 32 having its opposite ends hermetically closed by an integral, domed end cap 34 and a port forming plate 36, respectively. The plate 36 is welded or brazed to the vessel 32 so that the housing assembly easily withstands high internal pressures. Referring to FIG. 1, refrigerant flow tubes 40–43 are hermetically joined to refrigerant ports 45–48 formed in the plate 36. The flow tube 40 is hermetically connected to the compressor discharge line and to the port 45 (the high pressure port) for directing high pressure, high temperature gaseous refrigerant into the housing assembly. The flow tube 41 is hermetically joined to the compressor inlet and to the housing port 46 (the low pressure port) for directing low pressure relatively low temperature refrigerant from the housing assembly into the compressor. The flow tube 42 is hermetically joined to the outdoor heat exchanger OX and to the system port 47 for handling refrigerant flow between the outdoor heat exchanger and the housing assembly 22. The flow tube 43 is hermetically joined to the indoor heat exchanger IX and to the system port 48 for handling refrigerant flow between the indoor heat exchanger and the housing assembly 22. The flow tubes are preferably copper or a similar material suitable for hermetic brazing or equivalent bonding to the system refrigerant flow lines and to the port plate 36.

The valve member 24 moves relative to the housing assembly between alternative positions with respect to the port plate 36 to direct the refrigerant flow first in one direction through the system S and then in the opposite direction. The valve member 24 comprises a generally cylindrical valve body 50 fitting loosely within the pressure vessel 32 and a flow restrictor ring 52 seated in a ring groove 54 and extending about the body 50 for engagement with the housing wall. The flow restrictor ring 52 is constructed like a piston ring and effectively divides the chamber 30 into chamber portions 30a, 30b on respective opposite axial sides of the ring 52.

The valve body 50 defines a base section 56 confronting the port plate 36, a remote guide section 58 defining the groove 54 and supporting the sealing ring 52, and a central body section 59 between guide and base sections. The base section 56 defines a planar valve seating face 60 confronting a planar valve seat 61 defined by the port plate 36 and refrigerant directing flow channels 62, 64 opening in the face 60. The flow channel 62 is an elongated dome-like recess in the base section 56 which opens in the seating face 60. The flow channel 62 is aligned with the low pressure port 46 at all times and is referred to as the low pressure channel. The flow channel 64 is a curved recess in the base section 56 which is aligned with the high pressure port 45 at all times. The channel 64, referred to as the high pressure channel, opens in the base section seal face 60 and circumferentially nearly 180° about the base section perimeter into the chamber portion 30a. An imperforate septum 68 extending between the flow channels 62, 64 forms part of the seating face 60. The septum 68 defines a nose-like projection 69 extending into the flow passage 64.

In the illustrated valve body 50 the seating face 60 is formed by a sheet-like resilient gasket 60a bonded to the valve member base section end face. The sizes and shapes of the gasket 60a and the base section end face proper are substantially similar. The seating face 60 conforms to the port plate seat 61 so that when the seating face 60 and seat 61 are engaged, the gasket material is resiliently compressed and the faces efficiently seal the low pressure refrigerant in the channel 62 from the high pressure refrigerant in the chamber portion 30a surrounding the seating face 60.

When the valve member is in its first position the flow channel 64 is aligned with the ports 45, 48 so that high pressure refrigerant from the compressor discharge is directed to the heat exchanger IX. At the same time the flow channel 62 is aligned with the system port 47 and the low pressure port 46 so that the channel 62 communicates refrigerant from the heat exchanger OX to the compressor intake.

The valve member moves to its second position by shifting axially away from the port plate 36, rotating 90° about the longitudinal housing assembly axis 70 and shifting back into engagement with the port plate 36. When the valve member is in its second position the flow channel 64 communicates the ports 45, 47 while the flow channel 62 communicates the ports 46, 48. Thus high pressure gaseous refrigerant is directed to the heat exchanger OX from the compressor via the ports 45, 47 while low pressure refrigerant is returned to the compressor from the heat exchanger IX via the ports 46, 48.

In the preferred embodiment of the invention the valve body 50 is formed with a trunnion 71 (FIG. 2) projecting from the septum 68 on the axis 70 into a blind hole in the port plate 36. The trunnion 71 maintains the valve member aligned on the axis 70 during valve member rotation and slides axially in the blind hole when the valve member shifts to and away from the seat 51. The valve body guide section 58 supports the ring 52 remote from the trunnion 71 so that as the valve member moves axially toward and away from the seat 51 the valve member remains closely aligned with the axis 70.

The flow restrictor ring 52 is so constructed and arranged that high pressure refrigerant gradually leaks past it into the housing assembly chamber portion 30b remote from the ports 45–48 until the pressures on opposite sides of the ring 52 equalize. The preferred ring is a spit plastic ring having overlapped ends which serve to impede but not block fluid flow past the valve member. The ring 52 exhibits a low coefficient of sliding friction when engaged with the housing wall and with the valve member material. The ring 52 does not frictionally resist motion of the valve member relative to the housing to any material degree.

When the pressures in the chamber portions 30a, 30b have equalized (which is the normal operating condition of the valve) the pressure in the chamber portion 30b is essentially at the compressor discharge pressure level. The pressure acting on the effective area of the flow channel 62 is essentially at the compressor inlet level. Accordingly the valve body seating face 60 is forcefully urged into tight sealing engagement with the seat 61 by the net differential pressure force applied to the valve member 24.

In some applications it may be desirable to augment the restricted flow provided by the ring 52. This can be accomplished by forming a supplemental restricted flow path (not illustrated) in the valve body extending between the chamber portions 30a, 30b which bypasses the ring 52. The flow path provides for quicker pressure equalization so that the valve member seats on the port plate promptly after changing position.

The valve carrier 26 is constructed and arranged to support the valve member 24 for axial and rotational motion with respect to the housing assembly 22 while maintaining the valve member aligned with the housing assembly axis 70. The illustrated carrier 26 comprises a guide member 72 for centering the valve member 24 on the axis 70 and a spindle member 74 coupling the valve member to the guide member 72. The spindle member 74 is fixed to the valve member so that the spindle member rotates and moves axially with the valve member. The guide member 72 is constrained for movement only axially within the vessel.

The guide member 72 slides axially in the pressure vessel 32 with the valve member 24 while maintaining the valve member properly aligned with the axis 70. The illustrated guide member 72 comprises a flat circular body 76 centered on the axis 70, ribs 78 projecting axially from the body periphery at circumferentially spaced locations, and a cylindrical skirt-like section 80 coextending from the body 72 with the ribs and joining the ribs radially inwardly from the body periphery.

The ribs 78 ride on the vessel wall as the guide member shifts axially in the housing 22. The ribs 78 are oriented so that their narrow, radially outer edges engage the vessel wall at circumferentially spaced locations. The ribs are quite narrow and thus make low friction sliding contact with the vessel wall. The skirt section 80 reinforces the ribs and rigidifies the body 76. The body 76 defines a spindle receiving bearing opening 81 (FIG. 2) on the axis 70 which is surrounded by a stiffening collar.

The spindle member 74 connects the valve member 24 to the guide member 72 for common axial motion and transfers torque from the actuator 29 to the valve member 24 for rotating the valve member between its positions. The spindle member thus rotates about the axis 70 and moves axially along the axis with the valve member. The spindle member 74 is generally cup-shaped having a circular base 82 confronting the guide member 72, an open end defined by a radially extending flange 83 fixed to the valve body guide section 58, and a trunnion 84 projecting from the base 82 through the guide member bearing opening 81.

The preferred spindle flange 83 is seated upon and bonded to the valve member 24 so the spindle member and valve member move as a unit. The spindle flange is generally circular except for a circumferential alignment notch 83a. The flange 83 seats in a conforming recess in the valve member guide section face 58a so that the notch 83a interfits with a key-like section of the guide section face recess. This assures that the spindle member and valve member are accurately aligned when they are bonded together.

The preferred and illustrated trunnion 84 latches the spindle and guide members 72, 74 together to assure joint axial movement while permitting relative rotation between them. The trunnion 84 comprises four spaced semicylindrical arms projecting from the base 82 through the opening 81. Each arm defines a latch structure 85 having a frusto-conical cam section 85a terminating in a latch face 85b. The cam section 85a diverges proceeding away from the projecting trunnion arm end so that as the arms are inserted through the opening 81 the cam sections 85a engage the opening sides and resiliently deflect the arms until the cam sections have passed entirely through the opening 81. At this juncture the latch faces 85b snap radially outwardly from the axis 70 into confronting, latching relationship with a keeper face formed by the guide member base 76 immediately surrounding the opening 81. The trunnion arms are received loosely in the opening 81 after they latch in place so that relative rotation between the spindle and guide members is facilitated.

The actuator 28 moves the valve member between the first and second positions. The preferred actuator comprises control valving 90 (see FIGS. 3–6) for unseating the valve member 24 and shifting it axially from one position, an actuator mechanism 92 acting on the unseated valve member for revolving it into alignment with its alternative position and reseating the valve member, and an operator 94 for the control valving 90 and the actuator mechanism 92.

The operator 94 actuates the control valving 90 for unseating the valve member and conditions the actuator mechanism 92 for moving the valve member to its alternative position. The operator comprises a low power solenoid 100 and an operating slide 102 engaged and reciprocated by the solenoid 100. The solenoid 100 is energized and deenergized by a suitable switch (mechanical or electronic), not illustrated, which may in turn be controlled by a timer, a temperature sensor or any other suitable or conventional device for effectuating refrigerant flow reversal in a refrigeration system.

Figure 3A:
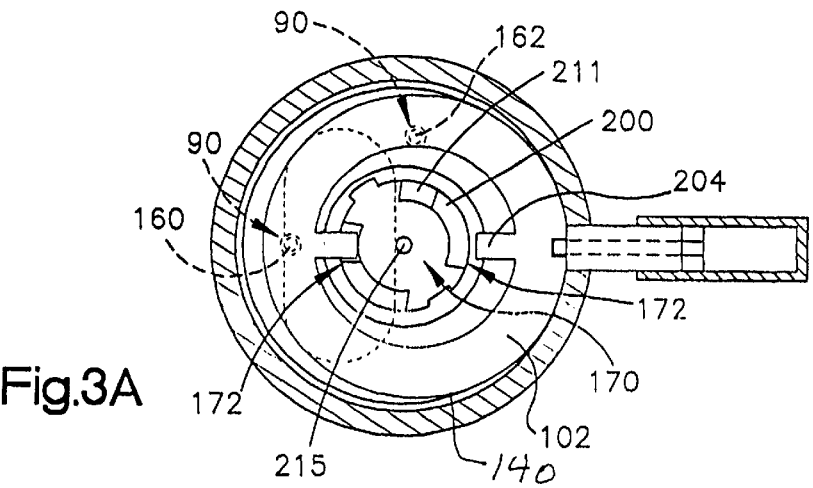
FIG. 3A is a cross sectional view seen approximately from the plane indicated by the line 3A—3A of FIG. 3B.
Figure 3B:
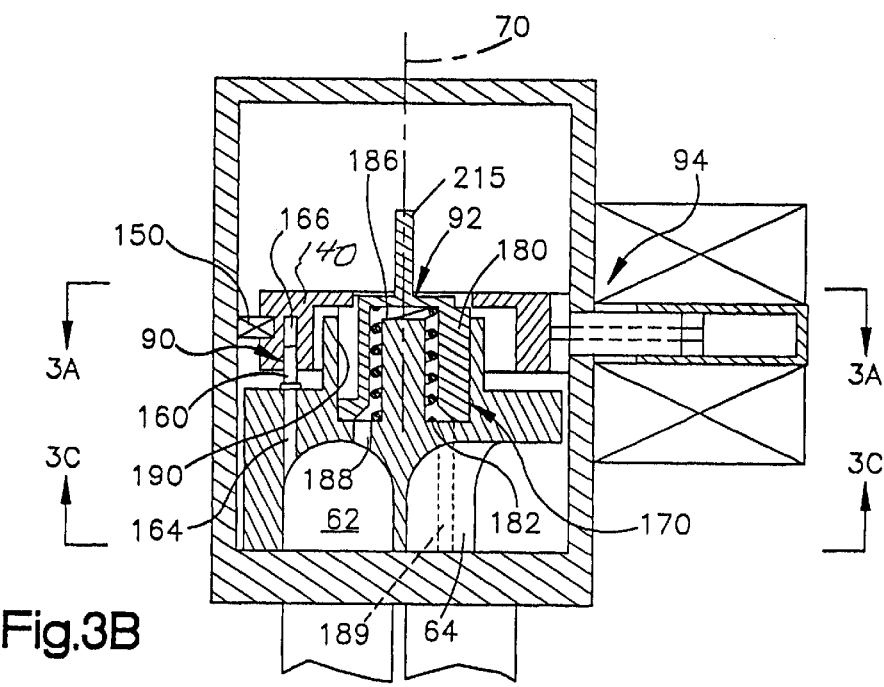
FIG. 3B is a cross sectional view, similar to FIG. 2, in which the valve is illustrated schematically in one operating condition with various valve parts omitted for purposes of clarity.
Figure 3C:
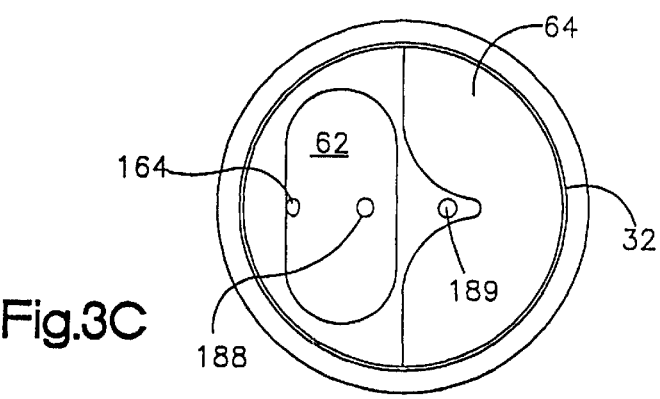
FIG. 3C is a cross sectional view seen approximately from the plane indicated by the line 3C—3C of FIG. 3B.
Figure 6A:
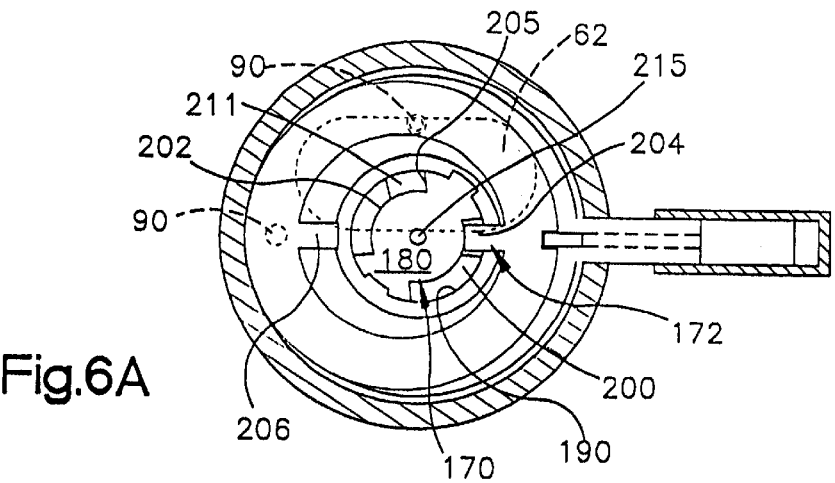
FIG. 6A is a cross sectional view seen approximately from the plane indicated by the line 6A—6A of FIG. 6B.
Figure 6B:
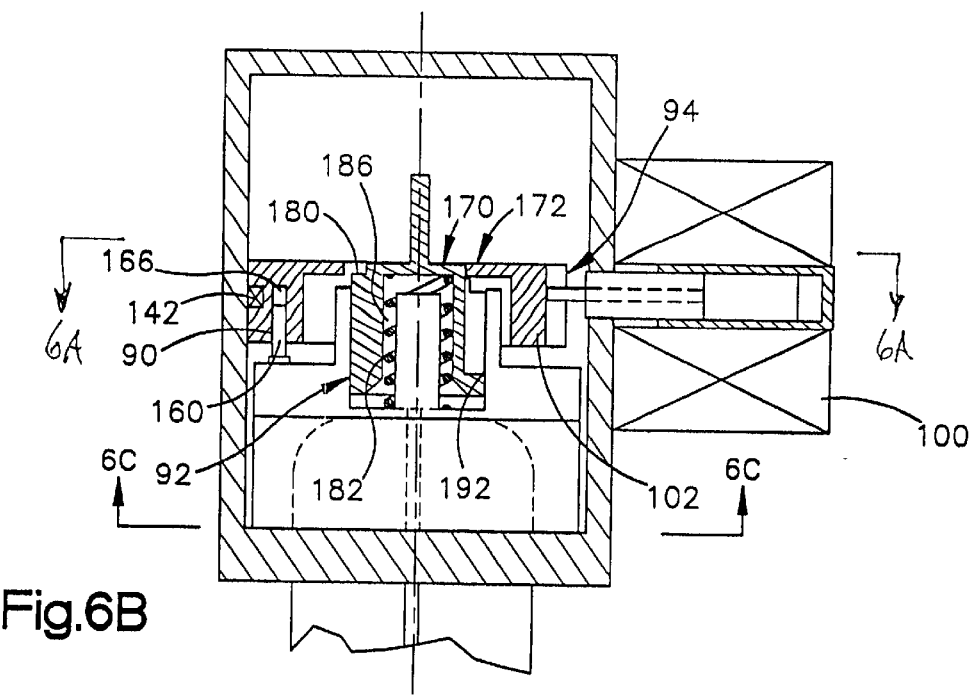
FIG. 6B is a cross sectional view, similar to FIG. 2, in which the valve is illustrated schematically in one operating condition with various valve parts omitted for purposes of clarity; and, FIG. 6C is a cross sectional view seen approximately from the plane indicated by the line 6C—6C of FIG. 6B.
Figure 6C:
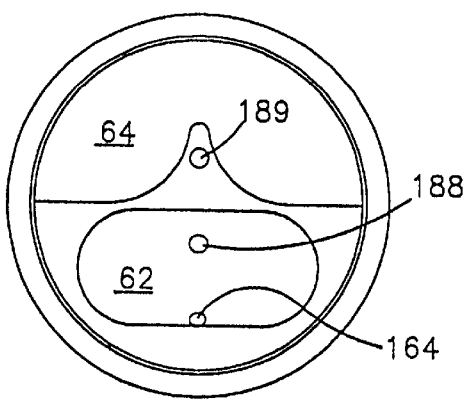

When the solenoid 100 is deenergized the valve 20 is actuated to and remains in its first position (FIGS. 3A–C). When the solenoid 100 is energized, the valve 20 is actuated to and remains in its second position (FIGS. 6A–C). The solenoid 100 is illustrated as comprising a coil assembly 110 (FIG. 1) fixed to the housing assembly 22, and a plunger assembly 111 extending through the coil assembly and the housing vessel (32) wall to the slide 102.

The coil assembly 110 comprises an insulated wire coil wound on a tubular spool, a molded plastic body 110a encapsulating the coil and forming an electric terminal structure 110b connected to the coil leads, a flux conducting frame 110c partially surrounding the coil, and a pole piece 112 coacting with the plunger assembly as well as supporting the solenoid 110 and hermetically joining it to the housing assembly. The pole piece 112 is a tubular cylindrical, magnetically permeable member hermetically welded in the housing wall hole and projecting from the housing wall normal to the axis 70. The pole piece 112 projects partially into the coil and body 110a with the pole piece bore serving as a plunger guide.

The frame 110c is a generally U-shaped magnetically permeable sheet metal member having legs 113 and a bight portion 114. The coil and body 110a are received between the legs 113. The legs define aligned plunger openings which are in turn aligned with a central cylindrical opening through the coil and body 110a. The plunger assembly 111 extends through the coil and body and the frame openings and is hermetically joined to the pole piece 112.

The plunger assembly 111 comprises a thin walled tubular housing 130 which is closed at its end 130a remote from the housing assembly 22 and hermetically bonded to the pole piece 112 adjacent the chamber 30; a cylindrical plunger element 134 in the housing 130 between the pole piece 112 and the closed housing end 130a; and a push rod 136 extending through the pole piece bore for transmitting plunger element motion to the slide 102. The pole piece 112, frame 110c and plunger element 134 are magnetically permeable and form a magnetic circuit so that when the coil is energized the magnetic flux in the circuit creates a magnetomotive force urging the plunger toward the pole piece. The housing 130 is formed from a non-magnetic material, e.g. copper or non-magnetic stainless steel, and is quite thin to minimize flux gaps in the magnetic circuit. The open housing end is hermetically brazed to the pole piece.

The coil and plunger assemblies are detachably connected together for quick and simple assembly and disassembly. The preferred coil and plunger assemblies are connected by a clip element 138 (FIG. 1) which resiliently grips the pole piece 112 while locking the frame 110c in its assembled position on the pole piece and plunger assembly with the coil between the frame legs 113. The pole piece is formed with a circumferential groove positioned adjacent the inside face of the frame leg 113 adjacent the valve housing 22. The clip element is preferably a formed wire spring resembling a hairpin. The frame and coil are assembled to the plunger assembly and the spring clip is manually inserted between the frame leg and coil end nearest the housing 22. The clip slides into the pole piece groove and resiliently grips the pole piece, preventing removal of the frame and locking the assemblies together.

The plunger element 134 is illustrated as a cylindrical member having its circumference formed in part by identical flat panels, each extending the length of the element, and intervening cylindrically curved surface segments engaging the smooth inner surface of the housing tube 130. The plunger element 134 is guided axially within the housing 130 by the cylindrically curved surface segments while the intervening panels provide passages for flow of fluid displaced by plunger element movement.

The push rod 136 transmits the plunger element motion to the slide 102 for actuating the valve member 24. The clearance between the push rod 136 and the pole piece bore enables fluid flow into and out of the housing tube 130 so fluid which might otherwise be entrapped, does not impede plunger motion. The push rod 136 is illustrated as a straight cylindrical member constructed from non-magnetic material.

The illustrated and preferred slide 102 shifts between first and second positions relative to the valve member to actuate the control valving 90 for unseating the valve member. The illustrated slide 102 also functions to condition the actuator for rotating the valve member 24 from one position to the other when the slide 102 changes position. The slide 102 comprises a body 140 engaged by the push rod 136 for sliding movement transverse to the axis 70 when the solenoid is energized, and a compression spring 142 reacting against the body 140 in opposition to the push rod for returning the slide body, push rod and plunger element to their initial positions when the solenoid is deenergized.

The slide body 140 is illustrated as an annular member nested in the guide member 72 and seated on the valve member guide face and the spindle flange 83 for sliding movement transverse to the axis 70. The axial slide body face confronting the valve member 24 defines diametrically located feet 144 (FIG. 1) projecting to and slidably engaging the valve member guide segment and the spindle flange 83. The feet 144 provide for relatively low friction relative rotation between the valve member and the slide body 140 as well as sliding movement of the slide body transverse to the axis 70. The slide body face portions 146 between the feet 144 are planar and recessed from the valve member guide section. The outer slide body periphery 148 is spaced from the housing assembly inner wall and axially adjacent the guide member skirt 80.

The compression spring 142 reacts against the slide body 140 at a location diametrically spaced from the push rod location. The illustrated spring 142 is a helical compression spring disposed in a conforming blind hole 149 in the slide body. The spring 142 is compressed and maintained in position by a guide member rib 78a. The rib 78a extends radially inwardly from the guide member skirt 80 and into a narrow, radially extending slide member slot 150 which bisects the hole 149. The spring 142 is thus captured within the hole 149 by the rib 78a. The projecting rib end is wedge shaped to facilitate assembling the guide member to the slide body 140 while compressing the spring 142.

The slide 102 moves along the axis 70 with the valve member 24 but is precluded from rotating relative to the housing with the valve member. The illustrated slide member is prevented from rotation with the valve member by the solenoid push rod 136. The push rod projects through the pole piece bore into the valve housing chamber portion 30b and into a narrow slide body slot 152. The slide body slot 152 snugly yet slidably receives the push rod 136 and extends in the slide body parallel to the axis 70.

The control valving 90 communicates the chamber portion 30b to the suction pressure flow channel 62 in the valve member whenever the solenoid 100 is energized or deenergized. When the control valving operates, the pressure in the chamber portion 30b is suddenly reduced substantially below, the pressure in the chamber portion 30a (initially at the compressor discharge pressure level). The resulting pressure differential between the chamber portions 30a, 30b immediately unseats the valve member, shifting it axially away from the plate 36. The valve member 24 shifts the carrier 26 and slide 102 with it as it is unseated. These components are all essentially disengaged from the valve housing wall so their, movement in the direction of the axis 70 is unhampered. The valve member 24 is freely rotatable relative to the guide member 72 and slide 102 so that negligible frictional resistance to valve member rotation about the axis 70 exists.

After the valve member is unseated, the ports 45, 46 communicate with each other in the chamber portion 30a and the ring 52 and control valving 90 communicate the chamber portions 30a, 30b. The pressure differential across the valve member is substantially reduced so the valve member 24 tends to remain in the unseated condition where it is free to rotate about the axis 70.

In the illustrated reversing valve the control valving 90 comprises first and second valve elements 160, 162 carried by the slide body 140 and a coacting vent passage 164 extending from the valve member passage 62 through the valve member guide section face 58a into the chamber portion 30b. Each valve element 160, 162 is shown as a poppet carried in a respective slide body guide opening 166 (see FIGS. 3–6). The poppets are stationed just greater than 90° apart from each other about the slide body central axis 70. When the valve member 24 is in its first position the poppet 160 closes the vent passage 164 (FIG. 3). When the valve member is in its second position the poppet 162 closes the passage 164 (FIG. 6). The poppets are captured within their respective openings 166 by the guide member skirt 80 (not illustrated in FIGS. 3–6, see FIG. 1) which remains aligned with and close to, or engaged with, the end of each poppet at all times.

Figure 4A:
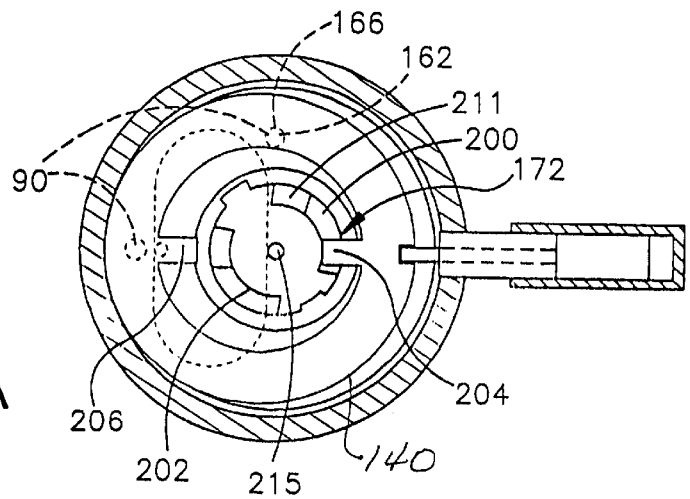
FIG. 4A is a cross sectional view seen approximately from the plane indicated by the line 4A—4A of FIG. 4B.
Figure 4B:
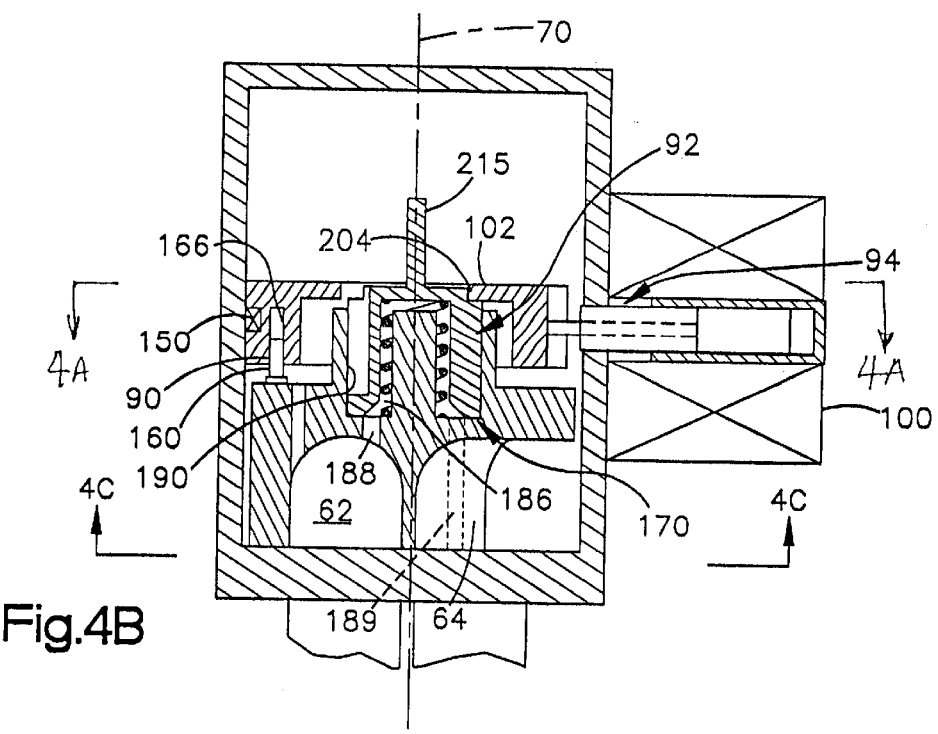
FIG. 4B is a cross sectional view, similar to FIG. 2, in which the valve is illustrated schematically in one operating condition with various valve parts omitted for purposes of clarity.
Figure 4C:
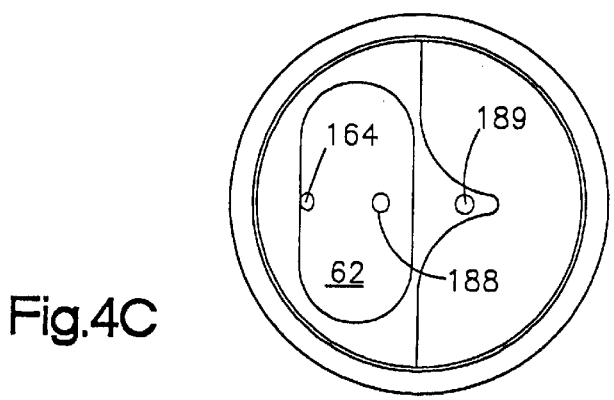
FIG. 4C is a cross sectional view seen approximately from the plane indicated by the line 4C—4C of FIG. 4B.

The slide 102 is shifted from its FIG. 3 position to its FIG. 4 position to slide the poppet 160 along the valve guide section face 58a and uncover the vent passage 164. The slide body 140 simultaneously shifts the poppet 162 into position for covering the vent passage 164 when the valve body completes its 90° rotation into axial alignment with its second position (as illustrated in FIGS. 5A–C). The open vent passage 164 communicates the chamber portion 30b to the low pressure flow channel 62 so that the pressure in the chamber portion 30b is immediately reduced to the compressor intake pressure level. The valve body then unseats and rotates 90° about the axis 70. The actuator mechanism operates the control valving 90 to reclose the vent passage 164 by shifting the poppet 162 to block the passage after the valve member has rotated.

When refrigerant flow is to be reversed the valve member 24 is returned to its first position (FIG. 3). The solenoid 100 shifts the slide 102 from its FIG. 5 position to its FIG. 3 position. The poppet 162 shifts with the slide to uncover the vent passage 164 while the poppet 160 moves into position for covering the vent passage 164 when the valve member completes its rotation. It should be noted that whichever poppet engages and seals the passage 164 is firmly seated by differential pressure force. The poppets are formed from plastic material which has a low coefficient of sliding friction against the valve guide section face 58a. Differential pressure forces acting on the poppets do not materially resist poppet movement when uncovering the passageway 164. The actuator mechanism 92 rotates the unseated valve member 24 about the axis 70 back and forth between its first and second positions (illustrated in FIGS. 3 and 6) and reseats the valve member. The illustrated actuator mechanism 92 comprises a fluid pressure responsive drive piston assembly 170 and an associated cam transmission 172.

The drive piston assembly 170 reciprocates cam transmission elements along the axis 70. The piston assembly 170 comprises a drive piston 180 carried by the valve member 24, a piston spring 182 reacting between the valve member 24 and the drive piston, and a piston seal 184 for sealing between the valve member and the piston to produce a piston chamber 186 containing the piston spring. A passage 188 (FIGS. 3–6) communicates the flow channel 62 with the piston chamber 186 at all times. A flow passage 189 extending between the valve member seating face 60 and the piston chamber 186 enables communication between the chamber portion 30a and the piston chamber 186 only when the valve member is unseated.

The drive piston 180 is mounted for reciprocation in the direction of the axis 70 relative to the valve member 24. The illustrated piston is a cup-like generally cylindrical member mounted in a cylindrical opening 190 in the valve member face 58a and centered on the axis 70. The piston spring 182 is a helical compression spring encircling a spring guide 192 projecting into the opening 190 and within the piston.

When the valve member 24 is in either of its first or second positions and the chamber portions 30a, 30b are both at the compressor discharge pressure level, the piston 180 is depressed fully into the opening 190, fully compressing the spring 182. The piston is depressed because the pressure in the piston chamber 186 is maintained at the compressor intake level via the passage 188 to the flow passage 62. The pressure differential across the piston 180 creates a force which exceeds the spring force and any frictional resistance to motion caused by the seal 184.

The piston seal 184 sealingly engages the cylindrical wall of the valve member opening 190 to preclude leakage past the piston. The preferred seal is a flexible circumferential lip continuously molded with the piston itself. Other seal structures may be employed, e.g. an O-ring. The piston spring 182 applies more than sufficient force to overcome the frictional resistance to reciprocating motion afforded by the seal 184 and move the piston when the piston is not subjected to a differential pressure.

When the valve member 24 is unseated, the pressure in the chamber portion 30b is essentially the same as the pressure in the valve member flow channel 62 so the piston 180 is not subjected to appreciable differential pressure. Accordingly the pressure force acting on the piston 180 and opposing the spring 182 is eliminated. The piston spring 182 then forces the piston out of the valve member opening 190 and into the spindle member 74. Piston movement by the stored spring energy animates the cam transmission 172 to rotate the valve member. This condition of the piston is illustrated by FIGS. 5A–C.

The cam transmission 172 reacts between the slide 102 and the valve member 24 to rotate the valve membere relative to the housing 22. The piston 180 is effectively keyed to the spindle member by tongue and slot structures so that the valve member is constrained against rotating relative to the valve member. The spindle member is provided with a tongue 194 interfitting with a conforming piston slot (FIG. 1). The spindle member is also provided with a slot 196 (FIG. 1) receiving a conforming piston tongue.

The cam transmission 172 rotates the valve member into alignment with its alternative position as the piston emerges from the valve member 24. The cam transmission 172 comprises cam faces, or ramps, 200, 202 formed on opposite sides the drive piston 180 and respective, diametrically opposed cam followers 204, 206 formed on the slide 102. The cam ramp 200 and follower 204 are engagable for rotating the valve member 24 is one direction about the axis 70. The cam ramp 202 and follower 206 are engagable for rotating the valve member in the opposite direction about the axis 70.

The cam face 200 is a helical ramp extending from the closed end of the piston 180 along its outer surface to a location axially spaced from the piston seal 184 at the opposite piston end. The cam ramp 200 is constructed so that the location of engagement between the ramp and follower 204 traverses a 90° arc about the piston axis 70 as the piston moves through its stroke.

The cam face 202 is a helical ramp extending from the closed end of the piston 180 along its outer surface to a location axially spaced from the piston seal 184 at the opposite piston end. The locus of engagement between the cam ramp 202 and the follower 206 traverses a 90° arc about the piston axis 70 as the piston completes its stroke. The helix angles of the cam ramps 200, 202 are identical but their twist directions, or hands, are opposite. Thus, the cam ramps are adjacent each other at their ends adjacent the piston seal and are adjacent each other at the opposite, projecting piston end.

Each cam follower 204, 206 is formed by a projection extending radially inwardly from the inner periphery of the slide body 140 for engaging a respective cam ramp 200, 202. The cam followers 204, 206 extend through clearance openings 208 (FIG. 1) in the spindle member side wall for engagement with the cam tracks. The clearance openings 208 are large and enable the valve and spindle members to rotate between their alternative positions without interference with the cam followers. The followers are passed through slots 82a in the spindle member base 82 when the valve 10 is being assembled.

When the valve member 24 is in its first (FIG. 3) position and the system flow is to be reversed, the solenoid is energized and moves the slide 102 to engage the cam follower 204 with the cam ramp 200 at the projecting piston end (FIG. 4). At the same time the slide 102 moves the follower 206 out of alignment with the ramp 202. The slide 102 also shifts the poppet 160 to uncover the vent passage 164 and the valve member 24 is unseated. See FIG. 5.

When the valve member 24 is unseated, the piston spring 182 forces the piston 180 out of the cylinder 190 and the valve member 24 rotates into alignment with its second position (FIG. 6). As the piston 180 emerges from the valve member opening 190, the cam ramp 200 and follower 204 engage and move relative to each other. The slide 102 is fixed against rotation with respect to the housing assembly 22 and the piston 180 is fixed against rotation with respect to the valve member 24. Accordingly, the reaction force between follower 204 and the cam ramp 200 rotates the valve member 24 about the axis 70 through the 90° angle of the follower and ramp engagement. The unseated valve member shifts into alignment with its second (FIG. 6) position, In the illustrated valve 20 the piston 180 carries identical lobe-like cam elements 210 radially outwardly from the cam ramps 200, 202 (See FIG. 1). One cam element 210 coacts with the follower 206 while the ramp 200 and follower 204 are engaged as the piston nears the end of its stroke. The cam elements 210 each provide an axially extending cam slot 211 for guiding the associated follower 204 or 206 as the piston completes its stroke and fully extends from the valve member.

It should be appreciated that when the valve member 24 is initially unseated and the actuator mechanism initially rotates the valve member, the passage 189 is opened and directly exposed to high pressure, hot gaseous refrigerant which is directed into the chamber portion 30*a* from the system. The passage 189 directs some of the high pressure gas into the piston chamber 186 where it is effective, at least initially, to supplement the piston actuating force of the spring 182.

When the valve member has completed its rotation and is aligned with its second position, the actuator 28 reseats the valve member 24 in either or both of two independent ways. First, the actuator mechanism exerts a force which urges the valve member into engagement with the seat 61. Second, as the valve member completes its rotation the control valving 90 operates to reestablish the valve seating pressure differential across the valve member, The actuator mechanism urges the valve member 24 onto its seat 61 as the piston 180 completes its stroke relative to the valve member 24 while constrained against axial movement relative to the housing assembly 22. Consequently, the valve member 24 moves axially in the housing assembly onto the seat 61. The preferred and illustrated piston 180 comprises a rod-like extension element 215 projecting through the trunnion for engagement with housing end cap 34. The valve member 24 completes its rotation before the piston 180 reaches the end of its stroke and before the piston extension 215 engages the end cap. As the piston continues its stroke the extension 215 engages the end cap and constrains the piston member against further axial movement with respect to the housing assembly. The compression spring 182 continues to react between the piston and the valve member so that a valve seating reaction force is applied to the valve member which urges the valve member onto the seat 61.

In the illustrated and preferred embodiment of the invention, the surface of each cam ramp 200, 202 merges with the surface of the associated lobe-like cam 210 to form part of each axially extending cam slot 211. The base of each cam slot 211 is formed by an axial stop face 217 located adjacent the piston seal 184. The cam followers 204, 206 engage the axial stop faces to prevent further movement of the piston out of the valve member. The axially extending cam slots 211 receive the cam followers after the valve member has rotated 90° and permit the piston to continue its stroke axially relative to the valve member. The axially extending cam slots 211 constrain the piston against any rotation relative to the valve member, which might otherwise misalign the valve member with the seat 61 and control valving 90.

Although the valve,seating force provided by the actuator mechanism is initially limited to the seating force produced by the spring 182, the pressure in the chamber portion 30*b* will eventually rise and supplement the spring force with a strong differential pressure seating force.

The actuator mechanism 92 actuates the control valving 90 by rotating the valve member 90° so the vent 164 is shifted to a position where it is covered and sealed closed by the poppet 162. This blocks communication between the chamber portion 30*b* and the low pressure flow channel 62. The chamber portion (30*b*) pressure begins to rise to the compressor intake pressure level because of restricted refrigerant flow past the restrictor ring 52. The resultant differential pressure force applied to the valve member 24 reseats the valve member in its second position (FIG. 6).

When the valve member 24 reseats, the piston chamber 186 is again communicated to the compressor intake suction pressure via the passage 188. The piston 180 experiences an applied differential pressure force (between the high pressure in the chamber portion 30*a* and the low pressure in the piston chamber 186) which far exceeds the force applied to the piston by the spring 182. The piston is thus forced back into the valve member opening 190, fully compressing the spring 182. Note that as the piston 180 is forced into the valve member opening, there is no tendency toward valve member rotation because the cam faces 200, 202 and the respective followers 204, 206 are disengaged and not aligned for actuating the valve member.

When the refrigerant flow is to be reversed again, the solenoid 100 is deenergized. The slide 102 moves from its FIG. 6 position aligning the follower 206 with the cam ramp 202. The poppet 162 shifts from the vent passage 164, unseating the valve member. The pressure differential across the piston 180 is eliminated and the piston 180 emerges from the valve member opening 190.

The cam ramp 202 and follower 206 engage and move relative to each other as the piston moves through its stroke. The slide 102 is fixed against rotation with respect to the hosing assembly 22 and the piston 180 is fixed against rotation with respect to the valve member. Accordingly, the reaction force between follower 206 and the cam ramp 202 rotates the valve member 24 about the axis 70 through the complete 90° angle occupied by the cam ramp 202. The still unseated valve member 24 shifts into alignment with its first (FIG. 3) position.

The piston 180 continues its stroke, engaging the extension 215 with the housing assembly end cap so that the piston spring 182 effectively forces the valve member into seating engagement with the seat 61. The cam followers 204, 206 move into their respective axial cam slots 211 as the piston continues its stroke. The cam slots 211 insure against valve member rotation as it moves to its seat, When the unseated valve member is initially aligned with its FIG. 3 position, the poppet 160 blocks the vent 164 so the chamber portion 30*b* is no longer vented to the flow channel 62. The chamber portion (30*b*) pressure begins to rise to the compressor intake pressure level as restricted refrigerant flow passes the restrictor ring 52. The rising pressure in the chamber 30*b* creates a pressure force exerted on the valve member 24 for urging it into firm seating relationship with the seat 61 (FIG. 3). The piston 180 is likewise forced back into the valve member opening against the spring force by the differential pressure force applied to it.

The construction and operation of the valve 20 permits its use in a variety of different sized refrigeration systems without significant risk of the valve failing to complete its reversing movement. The reason is that the new valve does not rely on the continued presence of a significant system pressure differential to complete a reversal. Assume that a reversal is called for in a relatively small capacity system S when the compressor C has just been turned off. The solenoid 100 actuates the control valving 90 to unseat the valve member 24. The high and low pressure sides of the system communicate via the unseated valve member. Since the system S is small it contains little refrigerant and the heat exchangers are small. Thus the system pressures equalize quickly. Nevertheless the valve member 24 rotates into alignment with its alternative position by virtue of the stored energy in the spring 182 and is reseated by the spring force as the piston 180 completes its stroke. This condition of the valve is illustrated in FIG. 2. When the compressor cycles "on" again, the refrigerant pressure gradually builds in the chamber portions 30a, 30b, creating a differential pressure force for strongly seating the valve member and depressing the piston 180 again to store energy for completing the next reversal in the spring 182.

Furthermore, because the valve member 24 is unseated when it is shifted between positions, high strength, durable polished seats and valve slide faces are unnecessary. Most of the components of the valve 20 can be constructed from molded plastic parts. The housing assembly, flow tubes, solenoid and the springs are constructed primarily from metal. The remaining parts are plastic. The labor and material costs for producing the new valve are significantly less than prior valves.

While a single preferred embodiment of the invention has been illustrated and described herein in considerable detail, the present invention is not to be considered limited to the precise construction disclosed. Various adaptations modifications and uses of the invention may occur to those skilled in the art to which it relates. The intention is to cover hereby all such adaptations modifications and uses as fall within the spirit or scope of the appended claims.

Having described my invention I claim:

1. A method of operating a reversing valve to alternately communicate a high pressure port with first and second system ports while thereby alternately communicating a low pressure port with the second and first system ports, respectively, comprising the steps of:
   a. positioning the valve member in a first position for communicating the low pressure port with the first system port;
   b. establishing a first pressure differential across the valve member by communicating a first valve member pressure area with the low pressure port and a second, opposed valve member pressure area with a greater pressure;
   c. forcibly seating the valve member against a seating face in the first position so that leakage between said high pressure port and said low pressure port along the seating face is substantially blocked;
   d. storing valve member actuating energy obtained from said first pressure differential;
   e. dissipating said first pressure differential to enable valve member shifting between said alternate positions with minimal resistance due to valve member seating force; and,
   f. expending stored actuating energy by shifting said valve member toward said alternate position.

2. The method claimed in claim 1 wherein storing valve member actuating energy obtained from said first pressure differential comprises loading an actuating spring and expending stored actuating energy by shifting said valve member toward said alternate position comprises unloading said spring.

3. The method claimed in claim 1 wherein shifting said valve member comprises rotating said valve member about an axis extending transverse to said seating face.

4. The method claimed in claim 3 further comprising shifting said valve member out of engagement with said seating face in the direction of extent of said axis.

5. The method claimed in claim 1 further comprising forcibly seating said valve member against a seating face in said alternate position.

6. The method claimed in claim 1 further comprising disengaging said valve member from said seating surface.

7. The method claimed in claim 6 wherein disengaging said valve member from said seating surface comprises establishing a second pressure differential across the valve member by communicating said low pressure port and said second, opposed valve member pressure area.

8. The method claimed in claim 7 wherein establishing said second pressure differential across said valve member comprises establishing a net differential pressure force acting on said valve member to disengage said valve member from said seating surface.

9. A method of operating a reversing valve to alternately communicate a high pressure port with a first system port while communicating a low pressure port with a second system port and to communicate the high pressure port with the second system port while communicating the low pressure port with the first system port comprising the steps of:
   a. positioning the valve member in a first position for communicating the low pressure port with the first system port;
   b. establishing a first pressure differential across the valve member by communicating a first valve member pressure area with the low pressure port and a second, opposed valve pressure area with a greater pressure;
   c. forcibly seating the valve member against a seating face in the first position so that communication between said high pressure port and said low pressure port is substantially blocked;
   d. communicating said first and second pressure areas to substantially change said pressure differential;
   e. moving said valve member out of engagement with the seating face;
   f. shifting said valve member into juxtaposition with a second position; and,
   g. seating the valve member against a seating face in the second position so that communication between said high pressure port and said low pressure port is substantially blocked.

10. The method claimed in claim 9 wherein shifting said valve member comprises rotating said valve member from alignment with said first position to alignment with said second position.

11. The method claimed in claim 10 wherein moving said valve member out of engagement with the seating face comprises moving said valve member in the direction of extent of the axis of rotation.

12. The method claimed in claim 9 further comprising storing valve member actuating energy obtained from said first pressure differential and utilizing the stored energy to shift said valve member.

* * * * *

US005878781C1

(12) EX PARTE REEXAMINATION CERTIFICATE (7972nd)
United States Patent
Parker

(10) Number: US 5,878,781 C1
(45) Certificate Issued: Jan. 11, 2011

(54) REVERSING VALVE AND METHOD

(75) Inventor: Thomas W. Parker, Columbus, OH (US)

(73) Assignee: Zhejiang Sanhua Co Ltd, Xia Liquan Chun, Xin Chang County, Zhejiang (CN)

Reexamination Request:
No. 90/009,624, Oct. 29, 2009

Reexamination Certificate for:
Patent No.: 5,878,781
Issued: Mar. 9, 1999
Appl. No.: 08/467,295
Filed: Jun. 6, 1995

Related U.S. Application Data

(62) Division of application No. 08/307,348, filed on Sep. 16, 1994, now Pat. No. 5,911,242.

(51) Int. Cl.
F16K 11/08 (2006.01)

(52) U.S. Cl. .................... 137/625.43; 251/160
(58) Field of Classification Search .............. 137/625–43
See application file for complete search history.

(56) References Cited

U.S. PATENT DOCUMENTS 2,855,000 A    10/1958    Van Allen et al.

FOREIGN PATENT DOCUMENTS

| JP | 61-38282 | 2/1986 |
| JP | 61-48684 | 3/1986 |
| JP | 60148684 | * 3/1986 |

* cited by examiner

Primary Examiner—Joseph A. Kaufman

(57) ABSTRACT

A reversing valve for a vapor compression refrigeration system comprising a housing defining a chamber with a high pressure port, a low pressure port and first and second system ports opening into said chamber through a chamber wall; a valve member disposed in the housing for shifting movement generally parallel to the wall between a first position wherein the valve member communicates the low pressure port with the first system port while communicating the high pressure port with the second system port and a second position wherein the valve member communicates the low pressure port with the second system port while communicating the high pressure port with the first system port, the valve member blocking communication between the high and low pressure ports when in the first and second positions; the valve member subjected to a net differential pressure force acting to firmly seat the valve member in the first or second position for preventing leakage between the high pressure port and the low pressure port; and, an actuator for reversing the direction of the net differential pressure force acting on the valve member to unseat the valve member and move it away from its first or second position for facilitating the shifting movement to the other position.

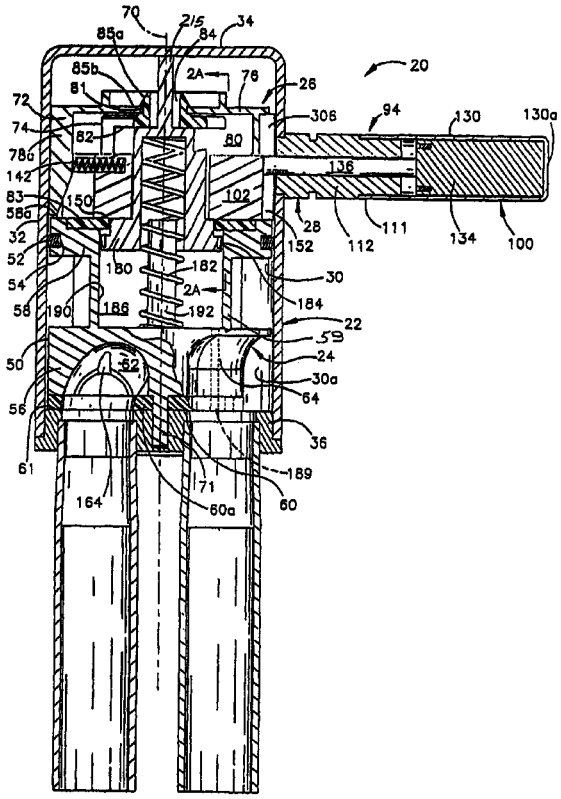

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 9 is determined to be patentable as amended.

Claims 10 and 11, dependent on an amended claim, are determined to be patentable.

Claims 1-8 and 12 were not reexamined

9. A method of operating a reversing valve to alternately communicate a high pressure port with a first system port while communicating a low pressure port with a second system port and to communicate the high pressure port with the second system port while communicating the low pressure port with the first system port comprising the steps of:

a. positioning [the] *a* valve member in a first position for communicating the low pressure port with the first system port;

b. establishing a first pressure differential across the valve member by communicating a first valve member pressure area with the low pressure port and a second, opposed valve pressure area with a greater pressure;

c. forcibly seating the valve member against a seating face in the first position so that communication between said high pressure port and said low pressure port is substantially blocked;

d. communicating said first and second pressure areas to substantially change said pressure differential;

e. moving said valve member out of engagement with the seating face;

f. shifting said valve member into juxtaposition with a second position; and, g. seating the valve member against a seating face in the second position so that communication between said high pressure port and said low pressure port is substantially blocked, *wherein said valve member shifts in a first direction when reseating in the second position and wherein said valve member shifts in a second direction when reseating in the first position.*

* * * * *